United States Patent
Evans et al.

(10) Patent No.: US 6,544,002 B1
(45) Date of Patent: Apr. 8, 2003

(54) METHOD OF CHEMICAL PRETREATMENT OF A LIGHTWEIGHT JET ENGINE FAN BLADE

(75) Inventors: Charles Richard Evans, Cincinnati, OH (US); Kathryn Ann Evans, Cincinnati, OH (US); Wendy Wen-Ling Lin, Niskayuna, NY (US); Mark Alan Rosenzweig, Hamilton, OH (US); Jeffrey Lynn Schworm, Delanson, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/039,394

(22) Filed: Nov. 7, 2001

(51) Int. Cl.[7] .................................................. F01D 5/28
(52) U.S. Cl. ................... 416/224; 416/233; 416/229 A; 416/241 A; 428/613; 428/469; 428/408; 29/889.2
(58) Field of Search ................................. 416/224, 233, 416/241 A, 229 A, 243, DIG. 2, DIG. 5; 29/889.2; 427/377, 532, 585; 428/613, 256, 469, 408

(56) References Cited

U.S. PATENT DOCUMENTS

| | | | |
|---|---|---|---|
| 5,192,586 A | * | 3/1993 | Mertinooke et al. ........ 427/210 |
| 5,755,558 A | * | 5/1998 | Reinfelder et al. ......... 416/230 |
| 5,830,548 A | * | 11/1998 | Andersen et al. .......... 428/36.4 |
| 5,863,329 A | * | 1/1999 | Yamanouchi ............... 118/100 |
| 6,033,186 A | * | 3/2000 | Schilling et al. ........... 416/233 |
| 6,099,257 A | * | 8/2000 | Schilling .................... 416/229 |
| 6,287,080 B1 | * | 9/2001 | Evans et al. ............ 416/229 A |
| 6,376,008 B1 | * | 4/2002 | Steiner et al. ................. 427/96 |
| 6,454,536 B1 | * | 9/2002 | Evans et al. ............ 416/229 A |

* cited by examiner

Primary Examiner—Edward K. Look
Assistant Examiner—J. M McAleenan
(74) Attorney, Agent, or Firm—Jonathan P. Miller; Carmen Santa Maria; McNees Wallace & Nurick LLC

(57) ABSTRACT

A grit blasting and alkaline etch surface pretreatment that is applied to a metallic airfoil. The metallic airfoil includes pockets or cavities that have been fabricated into the airfoil to reduce the weight of the airfoil. The pretreatment includes grit blasting the surface of the pockets or cavities, followed by washing the airfoil and treating the airfoil in an alkaline etch bath. After any remaining solution from the bath is neutralized and within twenty-four hours of the end of the pretreatment, primer is applied to the surface of the pockets or cavities. After the primer is applied to the surface of the pockets, a lightweight resin is injected into the pockets and bonds to the primer forming a mechanical bond with good fracture toughness at elevated temperatures.

19 Claims, 2 Drawing Sheets

METHOD OF CHEMICAL PRETREATMENT OF A LIGHTWEIGHT JET ENGINE FAN BLADE

FIELD OF THE INVENTION

The present invention relates generally to a gas turbine blade component comprised of two or more components made from different materials, and more particularly to a process used in the construction of a lightweight jet engine fan blade.

BACKGROUND OF THE INVENTION

Gas turbine blades include, but are not limited to, gas turbine power generation equipment and gas turbine aircraft engines. A gas turbine includes a core engine having a compressor to compress the air flow entering the core engine, a combustor in which a mixture of fuel and the compressed air is burned to generate a propulsive gas flow, and a turbine which is rotated by the propulsive gas flow and which is connected by a larger diameter shaft to drive the compressor. A typical front fan gas turbine aircraft engine includes a high pressure turbine and a low pressure turbine, located aft of the high pressure turbine, which is connected by a smaller diameter coaxial shaft to drive a front fan, located fore of the compressor. The compressor may optionally include a low pressure compressor and a high pressure compressor, both located aft of the fan. The low pressure compressor is sometimes called a booster compressor or simply a booster.

The fan, the compressor blades and turbine blades have airfoils each include a airfoil portion attached to a shank portion and are attached to a rotating disc. Stator vanes are stationary airfoils which are attached to a non-rotating stator casing or engine frame. Stator vanes direct the flow of air from the rotating blades. Typically, there are alternating circumferential rows of rotor blades extending outwardly from the discs and stator vanes extending inwardly from the casings. When present, a first and/or last row of stator vanes (also called inlet and outlet guide vanes) may have their radially-inward ends also attached to a non-rotating gas turbine stator casing.

Conventional airfoil designs used in the compressor section at the engine typically have airfoil portions that are made entirely of metal, such as titanium or titanium alloys, or are made entirely of composite. A "composite" is defined to be a material having any (metal or non-metal) fiber filament embedded in any (metal or non-metal) matrix, but the term "composite" does not include a metal fiber embedded in a metal matrix. The term "metal" includes alloys such as titanium alloy Ti 6-4. An example of a composite is a material having graphite filaments embedded in an epoxy resin.

Fan blades are large and are fore of the compressor, while compressor blades in the front of the engine are large and become progressively smaller as the combustor portion of the engine is approached. Conversely, turbine blades are small and become progressively larger with departure from the combustor portion of the engine. Fan blades are usually the largest blades in the engine.

The all-metal blades, including costly wide-chord hollow blades used as fan blades, are heavier in weight which results in lower fuel performance and require sturdier blade attachments, while the lighter all-composite blades are more susceptible to damage from ingestion events also known as foreign object damage ("F.O.D"). Known to the art are hybrid blades including a composite blade having an airfoil shape which is covered by a surface cladding (with only the blade tip and the leading and trailing edge portions of the surface cladding comprising a metal) for erosion and F.O.D. The fan blades typically are the largest (and therefore the heaviest) blades in a gas turbine aircraft engine, and the front fan blades are usually the first to undergo F.O.D.

Various designs are under construction for gas turbine blades having reduced weight for use as gas turbine fan blades that are comprised of a combination of monolithic metal and non-metal materials and have the capability to resist F.O.D. Some of these designs include lightweight inserts molded into cavities of metal blades. The cavities are regions of the blade that have had metal removed to lighten the blade and the monolithic lightweight inserts are added to restore an aerodynamic shape to the blade that was altered by the inclusion of the cavity in the blade design. While both the lightweight inserts and the metallic portion of the blade are relatively monolithic materials having excellent strengths, the interface between the lightweight inserts and the metallic portion of the blade is the weak link wherin debonding and failure is most likely to occur. Typically, failures occur due to debonding between a primer applied to the metallic blade and the blade itself.

What is needed are improvements in the adhesion between the lightweight inserts molded into blade pockets and the metallic material of the blades at this interface. Pretreatment processes of lightweight jet aircraft fan blades that promote adhesion between the metal portion of the blade and lightweight inserts can provide such improvements.

SUMMARY OF THE INVENTION

The present invention is directed to improvements in the treatment of an aircraft engine fan blade comprised of lightweight inserts positioned in metal pockets. The fan blade is manufactured to have reduced weight by removing metal at preselected locations. These preselected locations take the form of pockets. The locations of the pockets are preselected so as not to adversely affect the structural integrity of the blade. The aerodynamic flow of air over the blade is restored by filling in the pockets with the lightweight inserts.

The bonding between the blade and the inserts is improved by a treatment method. First, the blade is pretreated by grit blasting, using a preselected grit to achieve a preselected surface finish, cleaning the surface, followed by a uniform etch in etchant followed by cleaning, prior to application of a primer. The etchant may be an alkaline solution, an acid solution, or a sequence that includes both alkaline and acid solutions, provided that cleaning and neutralization occurs between successive treatments in solutions. The lightweight insert material is applied to the pocket after the pocket is coated with a primer.

The advantage of the present invention is that the problem of poor bonding between the primer coating on the surface of the blade pockets and the metal that comprises the surface of the blade pockets is substantially reduced. This results in longer life of the fan blade and smooth airflow over the blade without out of balance conditions that can arise with loss of inserts. The present invention is a surface pretreatment prior to applying primer to the surface of the blade pockets. The increase in the bond strength between the primer and the surface of the blade pockets creates better adhesion between the primer and the metal surface of the blade, aid prevents delamination or loss of the inserts from the pockets.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
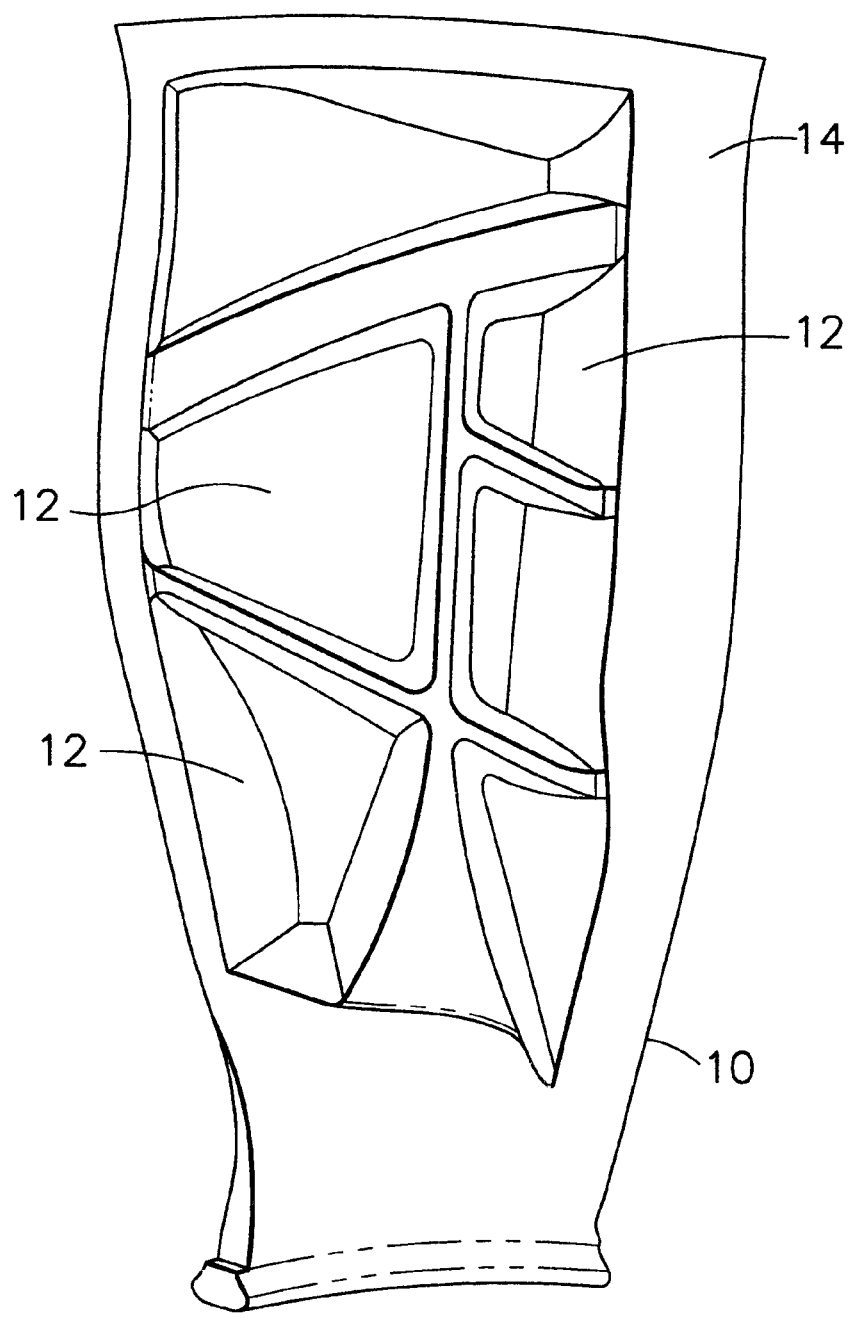
FIG. 1 is a perspective of an aircraft engine fan blade, showing pockets formed therein.

This invention is directed toward the chemical treatment of a metallic fan blade, such as used in jet engines, that has been machined to produce a preselected number of pockets in preselected locations on the blade. One such fan blade 10 is depicted in FIG. 1, showing pockets 12 formed in the airfoil surface 14. The purpose of this chemical treatment is to attain improved bond strength between the metallic blade pockets and the primer coat which is applied to the surface of the blade pockets, and to attain greater bond strength between a polymeric resin that comprises the lightweight inserts and the primer coat. The fan blade also has a dovetail portion 16, which does not undergo chemical treatment.

Fan blades used in jet engines consist of a blade portion and a dovetail portion which attaches a blade to the fan disc. The dovetail portion of the part requires no chemical treatment, and this invention is directed to the airfoil portion of the blade.

The airfoil portion of the blade should first be inspected to ensure that there are no nicks, dings, bent or deformed material, and that there is no unusual discoloration. Pockets are machined or cast into the surface of the blade. The as-manufactured surface finish on the pockets of the airfoil portion of the blade is not critical to the process of producing an optimized surface for bonding an insert within a pocket. The airfoil portion of the blade optionally may be cleaned prior to this process to remove any foreign material from the surface. A fixture on which the dovetail portion of the blade is to be hung for subsequent processing in accordance with this invention should be inspected to ensure that the blade is held rigidly without movement that can damage the edges of the airfoil portion of the blade.

This process makes use of deionized water in a number of the process steps. The deionized water used in this process should have a pH in the range of about 6.5 to about 7.5 and have a resistivity of at least about 50,000 ohms/cm in order to minimize smut formation on the blade. Smut formation is detrimental to bonding and should be eliminated or reduced to the maximum extent possible.

The first step in the process of the present invention is to grit blast at least the surface of the airfoil portion of the blade that includes the pockets with a preselected grit type at a preselected pressure for a preselected period of time. The purpose of the grit blasting is to obtain a substantially even surface finish to increase the ability of the primer to bond to the metallic surface of the pockets. In a preferred embodiment, the surface of the blade pockets are grit blasted using $Al_2O_3$, the size of the grit being in the range of about 120 grit to about 180 grit, at a pressure in the range of about 40 to about 60 psi. Oxides of other materials such as refractory metal oxides, for example $ZrO_2$ or SiO may be substituted for alumnia. The dovetail portion of the part typically is masked so that it is unaffected by grit blasting.

After the grit blasting is complete, the surface of the airfoil portion of the blade that was grit blasted is rinsed. In one embodiment, the airfoil portion of the blade is rinsed with deionized water for a preselected period of time to remove any loose particles from the surface of the blade. In a preferred embodiment, the airfoil portion of the blade is sprayed with deionized water for at least about three minutes. In an alternate embodiment, the blade is rinsed with a solvent which is miscible with water, and which has a volatility sufficient to accelerate the removal of liquid from the surface of the blade without leaving a stain. Desirably, the solvent also can remove any grease and other contaminants from the surface of the blade. The solvent used to rinse the airfoil portion of the blade is preferably an alcohol selected from the group consisting of ethanol, propanol, methanol or isopropyl alcohol. Isopropyl alcohol is the preferred alcohol used to rinse the part. Once the part has been rinsed with the solvent, it may be wiped with a solvent-saturated cloth and dried with a lint-free cloth. Drying is accomplished to prevent the formation of water stains. These water stains have been found to detrimentally affect bonding of the insert within a pocket.

The airfoil portion of the blade is then immersed in an alkaline etch bath in order to complete the creation of a proper surface finish for the application of a primer coat. If deionized water was used to rinse the airfoil portion of the blade, the airfoil portion of the blade must be immersed in an alkaline etch bath before the water dries on the surface of the blade to prevent formation of water stains. The water stains detrimentally affect the adhesion of subsequently applied primer. The dovetail portion of the blade typically is not immersed in the alkaline etch bath. As a practical matter, the tank that contains the alkaline etch bath should be made of a material or materials which are non-reactive with the alkaline bath in order to prevent the dissolution of any portion of the tank into the solution of the bath. The preferred alkaline component of the bath is TURCO 5578, a proprietary alkaline solute which is currently manufactured by Elf Atochem. TURCO 5578 is comprised primarily of NaOH and traces of petroleum distillates. The preferred composition of the alkaline etch bath is deionized water combined with a sufficient amount of TURCO 5578 in solution to ensure that the concentration of the TURCO 5578 is about 360 to about 480 grams of TURCO 5578 per liter of deionized water. Additionally, a preselected amount of ferric sulfate is added to the TURCO 5578 solution to ensure a concentration of iron of about 0.05 to about 0.15 grams per liter of deionized water. The addition of ferric sulfate to the alkaline etch bath maintains an iron concentration in the bath so that the etch rate is not greatly affected by the build up of dissolved Ti metal in the bath solution. The temperature of the bath should be in the range of about 180° F. to about 185° F. to minimize smut formation and provide a relatively even etch. The airfoil portion of the blade should remain in the bath for a preselected period of time sufficient to provide a uniform surface finish. Preferably, the airfoil portion of the blade should remain in the bath for a time of about 15 to about 17 minutes. Continuous agitation of the alkaline etch bath is preferable in order to further reduce smut formation on the airfoil portion of the blade. The etch rate of the titanium or titanium alloy should preferably be about 0.3 mils to about 0.7 mils per hour. The concentration of titanium in the alkaline etch bath should preferably not exceed 120 parts per million during the etching process to maintain the proper etch rate.

As the airfoil portion of the blade is removed from the alkaline bath, the airfoil portion of the blade is continuously rinsed with deionized water for a preselected period of time in order to prevent any solute from the alkaline bath from drying on the part and leaving a stain on the part. The rinse step preferably has a duration of at least three minutes in order to wash most of the alkaline solution from the airfoil portion of the blade. During the rinsing procedure, the airfoil portion of the blade optionally may be brushed to remove any smut that may be formed. In a preferred embodiment, the brush used should be a soft brush made of a synthetic material, such as a nylon brush, to avoid removing additional metal from the surface of the airfoil portion of the blade. The airfoil portion of the blade remains wet while it is being brushed in order to prevent the airfoil portion of the blade from drying with resultant formation of water stains on the surface which adversely affect adhesion of primer.

Once the smut has been removed from the surface of the airfoil portion of the blade, the airfoil portion of the blade is placed into an immersion bath of deionized water at a preselected temperature, for a preselected period of time in order to neutralize any remaining alkaline solution. The tank that contains the deionized water bath is comprised of a material or materials that are non-reactive with the deionized water bath in order to prevent the dissolution of any portion of the tank into the water bath. The deionized water bath is maintained at the preselected temperature during the entire time that the airfoil portion of the blade is in the bath. Once the airfoil portion of the blade is placed into the immersion bath, the bath is agitated for a preselected period of time to minimize smut formation on the airfoil portion of the blade. In a preferred embodiment, the temperature of the immersion bath should remain in the range of about 165° F. to about 185° F. If the temperature of the water is much higher than about 185° F., then water flashes upon removal of the blade and stains form. If the temperature is lower that about 165° F., then smut formation on the blade is promoted, which is still hot from the alkaline treatment. The airfoil portion of the blade should remain in the bath for a period of time not to exceed three minutes to prevent the formation of smut on the airfoil portion of the blade.

As the airfoil portion of the blade is being removed from the deionized water bath, it is continuously sprayed with deionized water at a preselected temperature in order to prevent any water stains from forming on the hot airfoil portion of the blade. The deionized water used in the spray is preferably at room temperature in order to prevent the deionized water from rapidly drying on the surface of the airfoil portion of the blade and leaving water marks. The airfoil portion of the blade should be sprayed for at least three minutes. After the airfoil portion of the blade is removed from the deionized water bath, it may be brushed to remove any smut which formed on the airfoil portion of the blade during the deionized water bath. In a preferred embodiment, the brush is a soft, synthetic preferably nylon brush in order to avoid scraping any metal off of the surface of the blade.

Once the part has been brushed, it is placed into a spray rinse comprised of deionized water within a preselected temperature range, for a preselected period of time in order to remove any alkaline solution remaining on the blade. In a preferred embodiment, the temperature of the spray rinse is maintained at room temperature for the duration of the spray step in order to prevent the deionized water from drying on the surface of the blade and leaving water stains.

As the part is being removed from the deionized water spray, and before any portion of the part is allowed to dry, the part is visually inspected to determine if it there are any water breaks on the surface of the blade pockets. If any water break is evident, indicative of a stain or an impurity, the part must be reprocessed, beginning with immersion in the alkaline bath. If the part requires reprocessing, it should be placed into the alkaline bath before any of the water on the surface of the blade dries in order to prevent water stains from forming on the surface of the blade.

After the part has been inspected successfully for any water breaks, and found to be free of water breaks, the part is immersed in an acid bath comprising deionized water and a preselected concentration of nitric acid for a preselected period of time. The purpose of the bath is neutralize any remaining alkaline etch solution remaining on the surface of the blade. Upon immersion of the blade into this bath, the bath is agitated for a preselected period of time. The acid bath should preferably include a solution about 1 to about 15 percent nitric acid by mass in deionized water in order to neutralize any remaining alkaline solution on the blade. In a preferred embodiment, the acid solution is about ten percent nitric acid. The temperature of the acid bath is preferably in the range of about 65° F. to 85° F. and the blade is immersed in the acid bath for a time of about one to about two minutes in order to minimize the formation of smut on the blade.

While the airfoil portion of the blade is being removed from the acid bath, it is continuously sprayed with deionized water at a preselected temperature in order to prevent the acid solution from drying on the blade and leaving any marks on the blade. The blade is rinsed for at least three minutes in order to remove any acid solution remaining on the surface of the blade. While the blade is being rinsed, it preferably is brushed to remove any smut which formed during the acid bath. In a preferred embodiment, the blade is brushed with a wet nylon brush in order to prevent any metal from being removed from the blade. In a preferred embodiment, the temperature of the spray rinse is maintained at room temperature for the duration of the spray step in order to minimize evaporation of the water which would leave water stains on the airfoil portion of the blade.

As the airfoil portion of the blade is removed from the deionized water spray rinse, the blade is inspected for any water break. If the blade shows any water break, it must be processed again beginning with the alkaline bath. The airfoil portion of the blade must be placed in the alkaline etch bath before any portion of the airfoil portion of the blade is allowed to dry in order to prevent the any water stains from forming on the surface of the airfoil portion blade.

After the part has been checked for water break and if no water break is found, the part may be rinsed with a solvent which is miscible with water, which will not cause a stain on the surface of the blade, and which will remove any grease and other contaminants from the surface of the blade. The solvent used to rinse the blade is preferably an alcohol, as previously set forth. Once the part has been rinsed with the solvent, it may be wiped with a solvent saturated cloth and dried with a lint-free cloth.

The blade is then dried using forced air in a fresh air circulating oven at a preselected temperature for preselected period of time. The airfoil portion of the blade preferably is dried for a period of time between about 10 minutes to about 60 minutes at a temperature between about 130° F. and about 300° F. and preferably between about 30 minutes and about 60 minutes at a temperature between about 135° F. and about 180° F. or alternatively for a period of time between about 10 minutes and about 30 minutes at a temperature between about 250° F. and about 300° F. in order to thoroughly dry the blade. The blade then is dried with a lint-free cloth.

Within twenty four hours of the drying step, the surface of the blade pockets are coated with a standard non-chromated spray primer to achieve a preselected cured primer thickness. If a chromated primer is used, a weaker bond will be formed between the surface of the blade and the primer and a weaker bond will be formed between the polymer resin used for the insert and the primer. The preferred polymer currently is polyurethane resin, although other resins displaying similar properties may be substituted. If more than twenty four hours passes between the drying step arid the application of the primer, a relatively large amount of titanium oxide, caused by reaction of air with the surface of the titanium alloy blade will form on the surface of the blade which will ultimately weaken the bond between the metal surface of the pockets and the lightweight inserts. The amount of primer coat thickness applied to the blade pockets preferably is sufficient to obtain a cured thickness between about 0.00002 and about 0.00020 inches. In a preferred embodiment, the primer is TYPLY BN®, a proprietary non-chromated primer available from Lord Corporation of Erie, Pa. Once the primer has been applied to the blade pockets, the primer is cured in two stages at pre-selected temperatures and for pre-selected periods of time. The primer preferably is cured for a minimum of 30 minutes at a temperature range of about 65° F. to about 85° F. and then immediately followed by curing in the range of about 60 minutes to about 90 minutes at a temperature in the range of about 250° F. to about 300° F. The resin is applied as set forth in U.S. patent application Ser. No. 09/044,255 incorporated herein by reference.

The blade pockets that are prepared using the methods and procedures of the present invention display improved fracture toughness at 310° F. when compared to blades having pockets prepared using various other methods. The fracture toughness performance of finished blades having pockets prepared by several techniques and then having the pockets filled with the same polyurethane resin as well as by the methods set out by the current invention preparation techniques prior to applying a primer are set forth in FIG. 2, all of which were tested at about 310° F. Each method refers to the method preparation techniques prior to applying a primer. As can be seen, the mode 1 fracture toughness of blade pockets prepared in accordance with the present invention displays a significant improvement over the baseline method of grit blasting using 36 grit at 80 psi.

Figure 2:
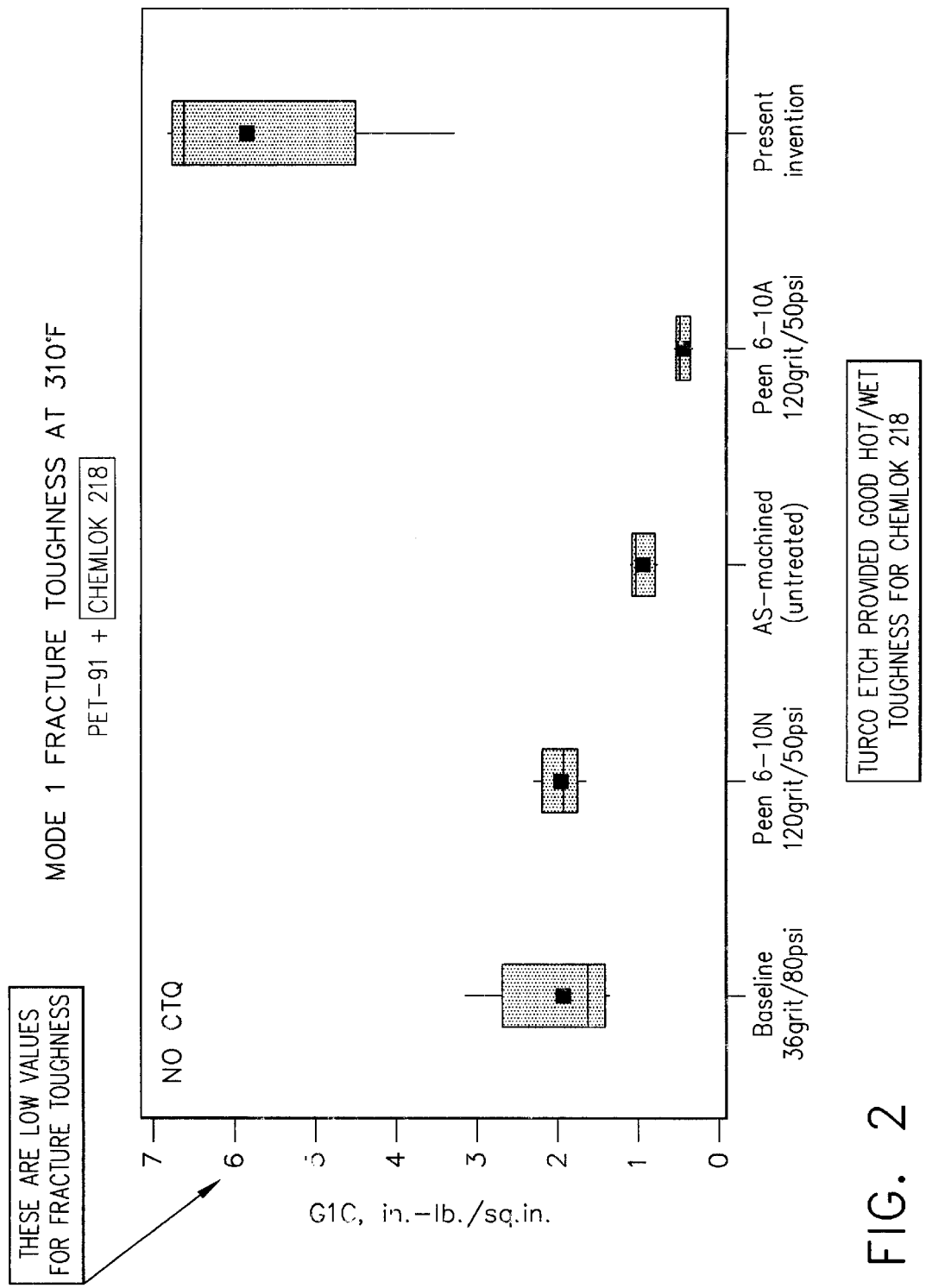
FIG. 2 is a graph of the performance of several different titanium surface preparations as a function of fracture toughness at 310° F.

FIG. 2. is a graph that illustrates the improvement that the present invention provides over other possible fan blade treatments. Five data points were gathered for each type of treatment. The lines running vertically illustrate the maximum and the minimum Mode 1 fracture toughness at 310° F. The shaded rectangles represent 75% of the data points gathered for each type of treatment. The horizontal line within the shaded rectangle represents the mean value of the data points. The black dot within the shaded rectangle represents the median value of the data points.

As shown in FIG. 2, looking to the mean of the data points, peening with an intensity of 6–10 N on the Almen N scale and 120 grit at 50 psi produced a fracture toughness equivalent to the toughness of the baseline method, while peening with less intensity, 6–10 A on the Almen A scale produced an inferior fracture toughness. Without any pretreatment of the pockets, a fracture toughness was obtained intermediate between the two methods employing peening. However, the present invention yielded fracture toughness improvements over the baseline method of between about 70% to about 200%.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of producing an aircraft engine blade, comprising an airfoil portion and a dovetail portion, and having at least one pocket in the airfoil portion, comprising the steps of:

providing an aircraft engine fan blade having at least one pocket in the airfoil portion;

grit blasting a surface of the airfoil portion having at least one blade pocket with a preselected type of grit, at a preselected size and at a preselected pressure to effect a uniform surface finish;

washing the surface with a solvent that is miscible in water and has a volatility sufficient to accelerate the removal of liquid from the surface without leaving a stain;

drying the surface by removing the solvent;

immersing the airfoil portion of the blade in an alkaline etch bath while agitating the etch bath to further effect a uniform surface finish;

removing the airfoil portion of the blade from the bath without allowing the airfoil portion of the blade to dry;

neutralizing the alkaline solution on the surface of the airfoil portion of the blade;

washing the surface with a solvent;

drying the surface wherein the solvent is removed from the surface of the airfoil portion of the blade without forming stains;

applying a primer to the at least one pocket of the airfoil portion of the blade;

curing the primer;

injecting a polymeric resin into the at least one pocket; and curing the resin.

2. The method of claim 1, wherein the alkaline etch bath further comprises a preselected concentration of NaOH and a predetermined iron concentration.

3. The method of claim 2, wherein the concentration of NaOH is about 360 grams to about 480 grams per liter of deionized water and the concentration of iron is about 0.05 to about 0.15 grams per liter of deionized water.

4. The method of claim 3, wherein the NaOH solution is TURCO 5578 in deionized water.

5. The method of claim 1, wherein the step of neutralizing further comprises the step of:

immersing the airfoil portion of the blade in a deionized water bath at a preselected temperature for a preselected period of time.

6. The method of claim 1, wherein the step of neutralizing further comprises the step of:

immersing the airfoil portion of the blade in an acid solution, having a predetermined concentration, at a preselected temperature for a preselected period of time.

7. The method as in claim 6, wherein the step of neutralizing further comprises the step of:

immersing the airfoil portion of the blade in a deionized water bath at a preselected temperature for a preselected period of time after immersion in the acid solution.

8. The method of claim 1, wherein the step of neutralizing further comprises the steps of:

immersing the airfoil portion of the blade in a deionized water bath at a preselected temperature for a preselected period of time, immersing the airfoil portion of the blade in a nitric acid solution, having a predetermined concentration, at a preselected temperature for a preselected period of time.

9. The method of claim 8, wherein the acid is nitric acid having a predetermined concentration.

10. The method of claim 9, wherein the nitric acid has a concentration of about 1% to about 15% by mass in deionized water.

11. The method of claim 1, wherein each washing step includes a solvent selected from the group consisting of ethanol, propanol, methanol and isopropyl alcohol.

12. The method of claim 11, wherein the solvent is isopropyl alcohol.

13. The method of claim 1 wherein the type of grit is selected from the group consisting of oxides of refractory metals.

14. The method of claim 13 wherein the grit is selected from the group consisting of $Al_2O_3$, $SiO$, $ZrO_2$.

15. The method of claim 14 wherein the grit is $Al_2O_3$.

16. The method of claim 15 wherein the size of the grit used is in the range of about 120 grit to about 180 grit.

17. The method of claim 16 wherein the pressure used for the grit blasting is in the range of about 40 psi to about 60 psi.

18. An aircraft engine fan blade having at least one pocket fabricated into the airfoil portion manufactured by the process of claim 1.

19. An aircraft engine fan blade having at least one pocket, said at least one pocket being filled with a resin, wherein the fracture toughness between the resin and metal surfaces of the pocket is characterized as being at least 4.4 in-lbs/in$^2$.

* * * * *

UNITED STATES PATENT AND TRADEMARK OFFICE
CERTIFICATE OF CORRECTION

PATENT NO. : 6,544,002 B1
DATED : April 8, 2003
INVENTOR(S) : Charles Richard Evans et al.

It is certified that error appears in the above-identified patent and that said Letters Patent is hereby corrected as shown below:

Column 7,
Line 10, "arid" should be -- and --.

Signed and Sealed this

Twenty-second Day of February, 2005

JON W. DUDAS
*Director of the United States Patent and Trademark Office*

UNITED STATES PATENT AND TRADEMARK OFFICE
CERTIFICATE OF CORRECTION

PATENT NO.   : 6,544,002 B1
DATED        : April 8, 2003
INVENTOR(S)  : Charles Richard Evans et al.

It is certified that error appears in the above-identified patent and that said Letters Patent is hereby corrected as shown below:

Column 7,
Line 29, "09/044,255" should be -- 09/440,255 --.

Signed and Sealed this

Seventh Day of June, 2005

JON W. DUDAS
*Director of the United States Patent and Trademark Office*